United States Patent [19]

Chen et al.

[11] 3,851,514
[45] Dec. 3, 1974

[54] SWING-OPEN CRIMPER

[75] Inventors: Karl K. Chen, Cleveland Heights; Hiralal V. Patel, Euclid, both of Ohio

[73] Assignee: The Weatherhead Company, Cleveland, Ohio

[22] Filed: July 18, 1973

[21] Appl. No.: 380,133

[52] U.S. Cl. .................................. 72/402, 29/237
[51] Int. Cl. ............................................ B21d 41/00
[58] Field of Search ............ 72/316, 317, 402, 399; 29/237

[56] References Cited
UNITED STATES PATENTS

| | | | |
|---|---|---|---|
| 3,072,174 | 1/1963 | Vanderhoof | 29/237 |
| 3,096,876 | 7/1963 | Scudieri | 29/237 |
| 3,335,594 | 8/1967 | Peterman | 72/402 |
| 3,720,088 | 3/1973 | Pauly | 72/402 |
| 3,742,754 | 7/1973 | Jeromson | 72/402 |
| 3,762,209 | 10/1973 | Herndon | 72/402 |

*Primary Examiner*—C. W. Lanham
*Assistant Examiner*—Gene P. Crosby
*Attorney, Agent, or Firm*—McNenny, Farrington, Pearne & Gordon

[57] ABSTRACT

A machine is disclosed for crimping a fitting onto a hose by means of a contractible collet assembly driven by a reciprocable ram. The ram includes a pusher assembly adjacent the working end thereof for transmitting ram force to the collet assembly. The pusher assembly includes first and second pusher members, and the pusher members are mounted for axial movement with the ram and for lateral swinging movement relative to the ram. In this manner, the pusher members transmit ram force to the collet assembly and are movable to expose the collet assembly for loading and unloading the workpiece and for changing the collet assembly to eliminate the long ram stroke and cycle time associated with prior art machines.

22 Claims, 5 Drawing Figures

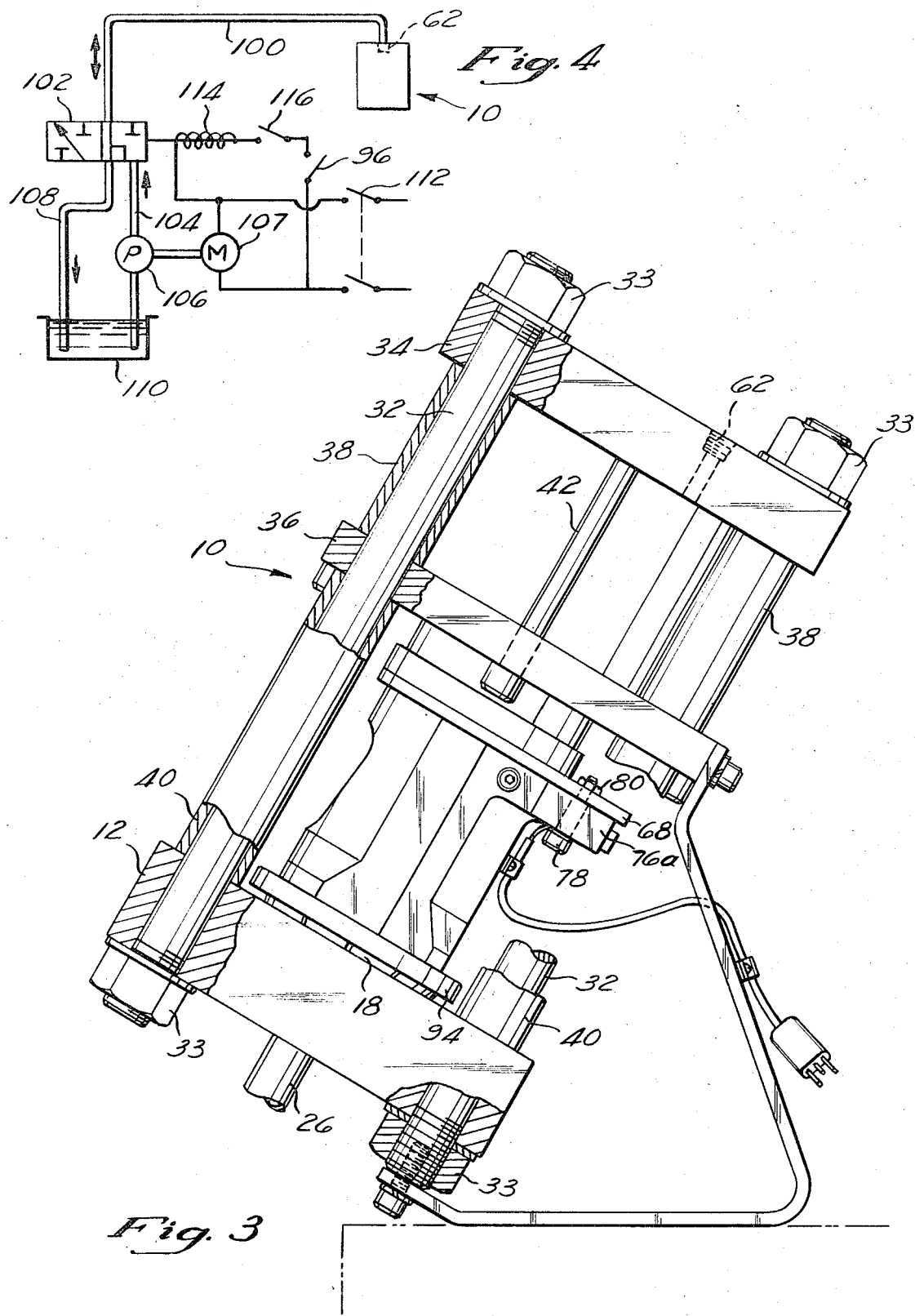

SWING-OPEN CRIMPER

BACKGROUND OF THE INVENTION

The type of machine with which the present invention is concerned is disclosed in U.S. Pat. No. 3,720,088 to Pauly et al., assigned to the assignee of this application. The machine includes a fixed bed plate and a reciprocable ram arranged to engage a collet assembly supported on the bed plate. The collet assembly includes a collet member comprising a plurality of segments or jaws which define a central aperture or collet bore for reciving the temporarily assembled fitting and hose. The collet member has an externally coned surface which is received within an internally coned socket or die ring of the collet assembly.

The ram is provided with a hollow, cylindrical configuration adjacent its working end to receive the protruding portions of the fitting which extend above the collet member. Upon the advance of the collet member into the die ring, the segments or jaws of the collet member are cammed radially inward to constrict the collet bore around the sleeve of the fitting until the sleeve is permanently crimped onto the hose end.

In accordance with the foregoing prior art structure, it is necessary to move the ram over a relatively long stroke since the fitting extends above the collet member and adequate clearance must be provided for loading and unloading the collet assembly upon retraction of the ram. The relatively long ram stroke is somewhat undesirable in a machine of this type due to the resulting increase in machine bulk, ram actuator size, cycle time and the corresponding increase in costs associated with the same.

The foregoing problems have been alleviated to a degree by the apparatus disclosed in pending U.S. Pat. application of James R. Jeromson, Jr. et al., Ser. No. 191,366, filed Oct. 21, 1971, now U.S. Pat. No. 3,742,754, and assigned to the assignee of this application. The apparatus disclosed therein includes a laterally extending, slotted bed which permits the fitting and hose to be preassembled and positioned in the collet assembly at a laterally spaced station clear of the ram. The preassembled fitting and hose and the collet assembly are then advanced along the slot in the bed to a crimping or working station below the ram. Consequently, the ram need not be retracted farther than where it provides enough clearance for the loaded collet assembly to be moved laterally into the working station.

SUMMARY OF THE INVENTION

The present invention provides a machine for crimping a fitting onto a hose or tube by means of a contractible collet assembly driven by a reciprocable ram. The ram includes a pusher assembly adjacent the working end thereof for transmitting ram force to the collet assembly. The pusher assembly includes first and second pusher members, and the pusher members are mounted for axial movement with the ram and for lateral swinging movement relative to the ram. In this manner, the pusher members transmit ram force to the collet assembly and are movable to expose the collet assembly for loading and unloading the workpiece and for changing the collet assembly to eliminate the long ram stroke and cycle time associated with prior art machines.

In the illustrated embodiments, the pusher assembly has a hollow, cylindrical configuration provided by separable semicylindrical halves each extending through an arc of about 180°. Each of the halves is mounted for lateral swinging movement about axes parallel with that of the ram movement. Accordingly, the collet assembly is conveniently disposed in an axially aligned position directly below the ram, and the pusher halves are movable to laterally spaced positions clear of the collet assembly for loading and unloading the workpiece and for changing the collet assembly.

When the pusher assembly is in its closed or ram force transmitting position after crimping a workpiece, the pusher assembly is disposed between the ram and the collet assembly with the pusher assembly end surface adjacent the collet assembly disposed slightly above the collet assembly a minimum clearance distance to minimize the ram stroke. The operator swings the semicylindrical halves of the collet assembly to their open positions to remove the crimped workpiece and to insert another workpiece and then swings the semicylindrical halves back to the force transmitting position. In order to assure that the pusher assembly is in the ram force transmitting position prior to ram actuation, the two pusher halves of the pusher assembly are arranged to close a normally open interlock switch in the ram actuator control when they are in the force transmitting position.

In another aspect of the present invention, the ram stroke is varied by means of ram stroke stops arranged to engage a radial shoulder of the ram. The ram stroke stops may be moved into and out of engaging positions with the ram shoulder depending upon the desired ram stroke.

BRIEF DESCRIPTION OF THE DRAWINGS

FIG 3 is a side elevational view of the apparatus illustrated in FIG. 1 with parts broken away for purposes of illustration;

FIG. 4 is a block diagram of a pump and control circuit for the apparatus illustrated in FIG. 1.

DESCRIPTION OF THE PREFERRED EMBODIMENTS

Figure 2:
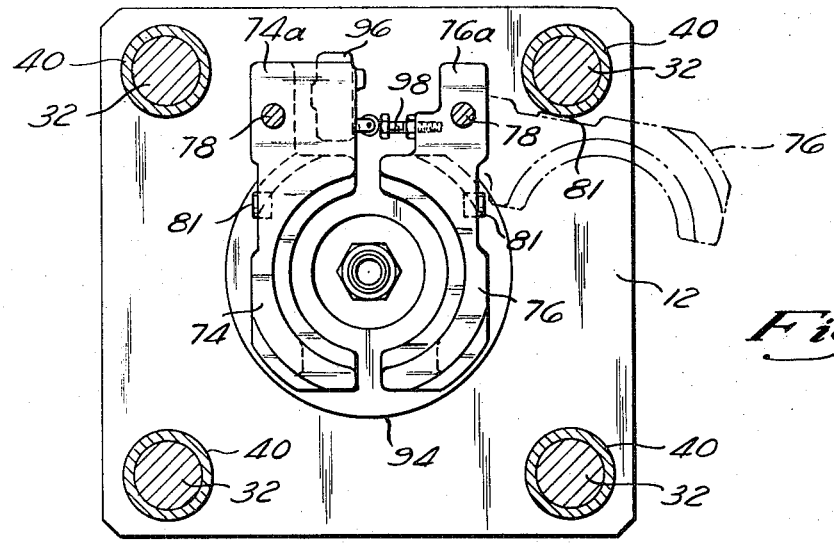
FIG. 2 is a sectional plan view of the apparatus illustrated in FIG. 1, the plane of the view being indicated by the line 2—2 in FIG. 1.
Figure 1:
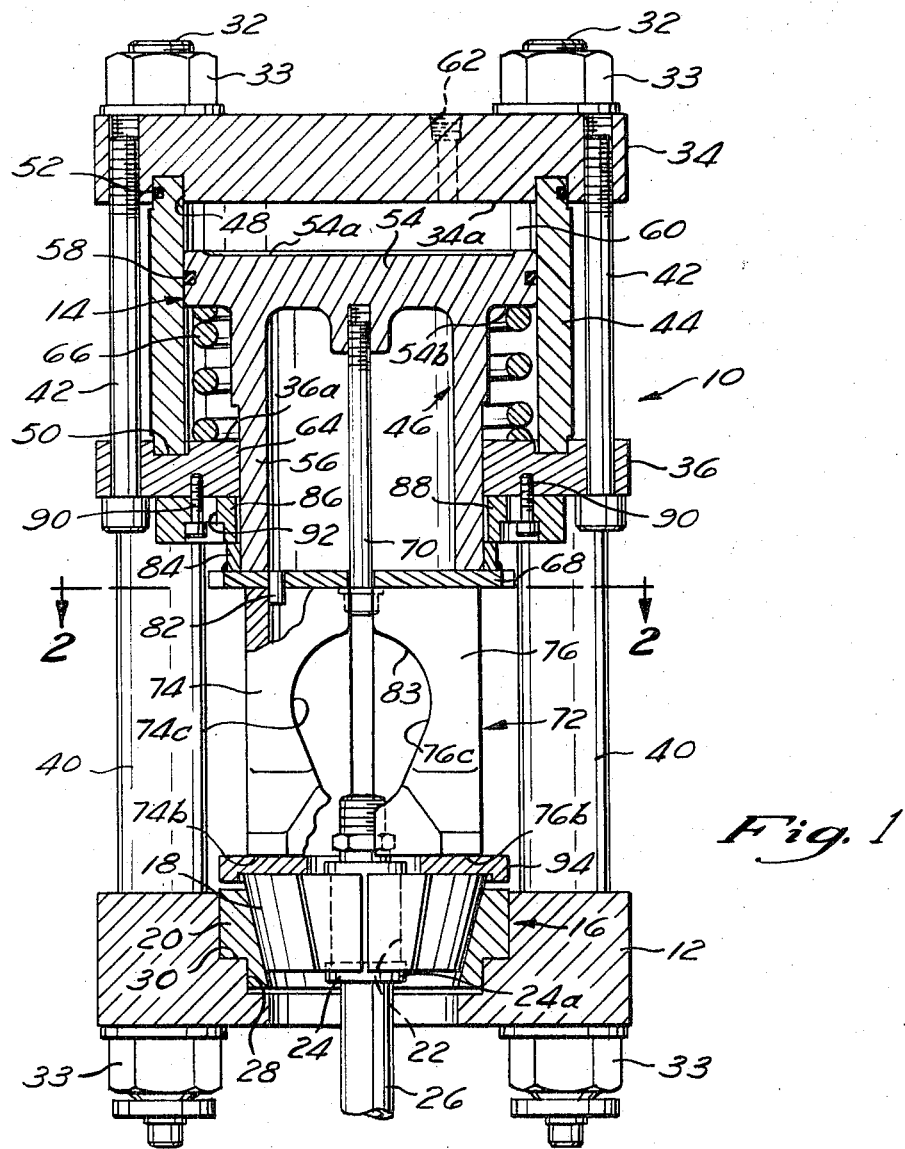
FIG. 1 is a front elevational view partially in section of a preferred embodiment of a collet crimping apparatus in accordance with the invention including a collet assembly having a fitting and hose provisionally assembled and received therein in a loaded position.

Referring to FIGS. 1 through 3 in greater detail, a crimping machine 10 embodying the principles of the present invention is shown. The machine includes a fixed bed plate 12, a ram 14 and a collet type die assembly 16. The collet assembly 16 includes a collet member 18 and a die ring 20. As indicated in greater detail below, the ram 14 is reciprocally movable toward the bed plate 12 to drive the collet member 18 into the die ring 20 to thereby cause the collet member 18 to contract and crimp a fitting sleeve.

The collet member 18 comprises a plurality of segments or jaws which define a central aperture or collet bore 22 for receiving a temporarily assembled fitting 24 and hose 26. The collet member 18 has an externally coned surface which is received within the internally coned socket provided by the die ring. Accordingly, the segments or jaws of the collet member 18 are radially inwardly cammed to deform the sleeve 24a of the fitting 24 onto the hose 26 upon the axial advance of the collet member into the die ring by the ram.

As shown most clearly in FIG. 1, the die ring 20 is supported in a stepped opening 28 in the bed plate 12. The opening 28 includes an internal shoulder 30 which is engaged by a correspondingly configured shoulder provided about the periphery of the die ring 20. The stepped opening 28 also provides a convenient means for loading a temporarily assembled fitting and hose by passing it upwardly therethrough and into its loaded position within the collet member.

A set of four spaced rod 32 are connected between the bed plate 12 and an upper end plate 34 which cooperates with a lower end plate 36 to support the ram 14. To that end, each of the rods 32 is provided with an upper spacer sleeve 38 and a lower spacer sleeve 40 which cooperate to support the end plates 34 and 36. In addition to its supporting engagement with the ends of the associated spacer sleeves 38 and 40, the lower end plate is retained in position by means of spaced bolts 42 which extend through the lower end plate 36 and are threadedly engaged with the upper end plate 34.

As best shown in FIG. 1, the ram 14 includes a bydraulic actuator including a hollow cylinder 44 and a reciprocating piston 46 therein. The axial ends of the cylinder 44 are received within annular grooves 48 and 50 respectively, provided in the upper and lower end plates 34 and 36. The cylinder 44 is securely clamped within the grooves 48 and 50 between the end plates 34 and 36 by the tightening of the nuts 33 which are threadedly engaged with the ends of the rods 32 and the tightening of the bolts 42 into engagement with the upper end plate 34. The upper end of the cylinder 44 is peripherally sealed in the groove 48 by means of an O-ring 52.

The piston 46 includes a head portion 54 and an axially extending cylindrical portion 56 of reduced diameter. The head portion 54 is provided with a circular configuration for sliding engagement within the cylinder 44 and an O-ring 58 provides a fluid tight seal therein. Accordingly, a variable volume chamber 60 is defined by an end face 54a of the piston head 54, the adjacent lower surface 34a of the upper end plate 34 and the portion of the inner peripheral surface of the cylinder 44 between the surfaces 34a and 54a.

The axes of the piston 46 and the cylinder 44 define the axis of the ram 14 which is perpendicular to the bed plate 12 and axially aligned with the collet assembly 16. As discussed in greater detail hereinafter, the variable volume chamber 60 is connected to a source of fluid pressure by means of a port 62 extending through the upper end plate 34. Upon pressurization of the variable volume chamber 60, the piston 46 is extended through a bore 64 in the lower end plate 36 during the crimping operation to drive the collet member 18 into the die ring 20.

The return movement of the piston 46 is provided by menas of a compression spring 66 which normally biases the piston of the retracted position in FIG. 1. The compression spring encircles the cylindrical portion 56 of the piston 46 and works between the lower annular surface 54b of the piston head 54 and an upper surface 36a of the lower end plate 36 to resiliently bias the piston 46 to its retracted position.

A rectangular shaped ram plate 68 is mounted adjacent the working end of the piston 46 by means of a bolt 70 extending through the plate and threadedly engaged with the head portion 54 of the piston. A pusher assembly 72 comprising separable pusher members 74 and 76 is mounted on the ram plate 68. The pusher members 74 and 76 are mounted on the ram plate 68 for pivotal, swinging movement by means of the mounting pins 78 (FIGS. 2 and 3) which are threadedly engaged with nuts 80. As shown in FIGS. 2 and 3, the mounting pins 78 extend through laterally projecting arm portions 74a and 76a provided by the respective pusher members 74 and 76.

The pusher assembly 72 is axially aligned with the ram 14 and is provided with a cylindrical hollow configuration extending through an arc of 360° defined by the pusher members 74 and 76 each of which extend through an arc of 180°. The pusher members 74 and 76 are semicylindrical and terminate at end faces 74b and 76b respectively, which are generally perpendicular to the axis of the ram 14. In the retracted position, the end faces 74b and 76b are slightly axially spaced from the collet assembly 16 a minimum distance on the order of one-half inch sufficient to allow clearance for the latter. In this manner, the working stroke and cycle time of the crimping machine are minimized.

As best shown in FIG. 2, each of the pusher members 74 and 76 is mounted for lateral swinging movement about an axis parallel with that of the movement of the ram 14 from its respective closed position to an open position laterally clear of the collet assembly 16 for loading and unloading the workpiece and for changing the collet assembly 16. The opening movement of the pusher members 74 and 76 is limited by the engagement of rubber bumpers 81, carried by each of the pusher members, with the adjacent sleeves 40. The pusher member 76 is shown in phantom outline in its full open position in FIG. 2.

When each of the pusher members 74 and 76 is manually moved to its open position, adequate clearance is provided for an operator positioned in front of the machine to load the collet assembly 16 and to visually inspect the alignment of the fitting 24 and hose 26 which are to be crimped. Thereafter, the pusher members 74 and 76 may be moved to their closed or ram force transmitting position in which the ram force is transmitted to the collet assembly 16 in order to crimp the sleeve of the fitting 24 onto the hose 26.

In order to assure the full closing of the pusher members 74 and 76, locator pins 82 (only one of which is shown in FIG. 1) extending downwardly from the ram plate 68 are provided. The locator pins 82 are arranged so that the inner surface of each of the pusher members 74 and 76 radially abuts its associated pin 82 when it is in its fully closed position.

In the closed position, the pusher assembly 72 extends about and substantially encircles the portion of the fitting 24 which protrudes above the collet assembly 16. In order to accommodate elbow fittings, each of the pusher members 74 and 76 is provided with an elongated recess 74c and 76c respectively which cooperate to define an opening 83 in the pusher assembly 72.

As best shown in FIG. 1, the ram stroke and retractive movement of the piston 46 are limited by the engagement between an annular ram shoulder 84 and movable, arcuate ram stops 86 and 88. The ram stops 86 and 88 are identical, and only the ram stop 86 will be discussed in detail. The arcuate ram stop 86 is connected to the lower end plate 36 by means of a threadedly engaged mounting bolt 90. The bolt 90 is received within a laterally elongated recess 92 having a shoulder against which the head of the bolt it tightened in order to secure the stop 86 in place. Accordingly, the ram stops 86 and 88 may be moved in a laterally outward direction so as to provide radial clearance for the shoulder 84 when an increased ram stroke is desired. The ram stops 86 and 88 may alternatively be mounted in any convenient manner including a pivotal mounting so as to permit them to be swung clear of the shoulder 84 without the necessity of loosening and tighteneing the mounting bolts 90.

A number of ram stops having different axial lengths may be employed with a single crimping machine in order to selectively limit the return axial movement of the ram 14 and increase the cycling capability of the machine. In addition, the ram stops 86 and 88 may be selected to permit the use of a pressure plate, such as the flat, round pressure plate 94 which assures uniform transmission of ram force to the collet assembly 16 and permits further variation in the axial movement of the ram 14 as disclosed in the aforementioned pending U.S. Pat. application Ser. No. 191,366, filed Oct. 21, 1971. In this manner, the number of collets necesary for covering a full range of hose size and pressure range combinations is greatly reduced.

In order to assure full closure of the pusher assembly 72 to a ram pressure transmitting position and the operator's safety, a normally open microswitch 96 is provided. The microswitch 96 prevents actuation of the ram 14 whenever the pusher assembly 72 is not in a closed pressure transmitting condition. The microswitch is mounted on the arm portion 74a of the pusher member 74 (FIG. 2) and is arranged to be engaged by a trip screw 98 carried by the arm 76a of the pusher member 76.

Referring to FIG. 4, the crimping machine 10 is schematically shown with its hydraulic circuit and electrical control circuit including the microswitch 96. The inlet port 62 of the crimping machine which communicates with the variable volume chamber 60 is connected by a line 100 to a two-position spool valve 102. The valve 102 is connected to a pressure supply line 104 from a pump 106 and is connected by a return line 108 to a reservoir 110. The pump 106 includes an internal relief valve, and it is driven by an electric motor 107 which is controlled by a master switch 112.

The spool valve 102 is operated by means of a solenoid 114 which is arranged to move the valve spool from its venting position shown in FIG. 4 to a pressurizing position for purposes of ram actuation as discussed below in greater detail. The solenoid circuit includes the microswitch 96 and a control switch 116 which is manually closed by the operator to provide ram actuation. Even if the operator closes the control switch 116, the solenoid 114 and ram 14 will not be actuated unless the pusher members 74 and 76 are closed so as to close the normally open microswitch 96. The microswitch can alternatively be placed in the electrical power circuit to the motor 107, so as to directly prevent operation of the motor 107 and pump 106 unless the pusher members 74 and 76 are closed.

At the start of the crimping operation, the pusher assembly 72 is in a loading position with both of the pusher members 74 and 76 swung open to laterally disposed positions clear of the collet assembly 16. The collet assembly 16 is loaded by introducing the provisionally assembled fitting 24 and hose 26 through the opening 28 in the bed plate 12 and into the central aperture 22 of the collet member 18.

After the fitting and hose have been properly positioned in the collet assembly 16, the pusher members 74 and 76 are closed to the ram force transmitting position shown in FIG. 2. The closing of the pusher members 74 and 76 simultaneously brings the trip screw 98 into engagement with the microswitch 96 to close the noramlly open switch 96. The operator then closes the control switch 116 to complete the circuit of the solenoid 114 which operates the spool valve 102 to its second position so as to deliver pressurized fluid to the variable volume chamber 60 through the line 100.

The pressurization of the variable volume chamber 60 will cause the extension of the ram 14 and the pusher assembly 72 to drive the collet member 18 into the die ring 20 so as to crimp the fitting 24 onto the hose 26. The crimping operation is completed when the pressure plate 94 comes into contact with the die ring 20. At this time, the operator opens the control switch 116 so as to de-energize the solenoid 114 and move the spool valve 102 to the venting position shown in FIG. 4. The variable volume chamber 60 is vented by means of lines 100 and 108 to the reservoir 110 as the ram 14 is being returned to its retracted position by the compression spring 66.

The pusher assembly 72 is then opened by moving the pusher members 74 and 76 to their laterally disposed positions so as to facilitate the removal of the hose 26 having the fitting 24 securely crimped thereto. The crimping machine 10 may then be immediately reloaded with another fitting and hose (not shown), and the crimping operation repeated.

Figure 5:
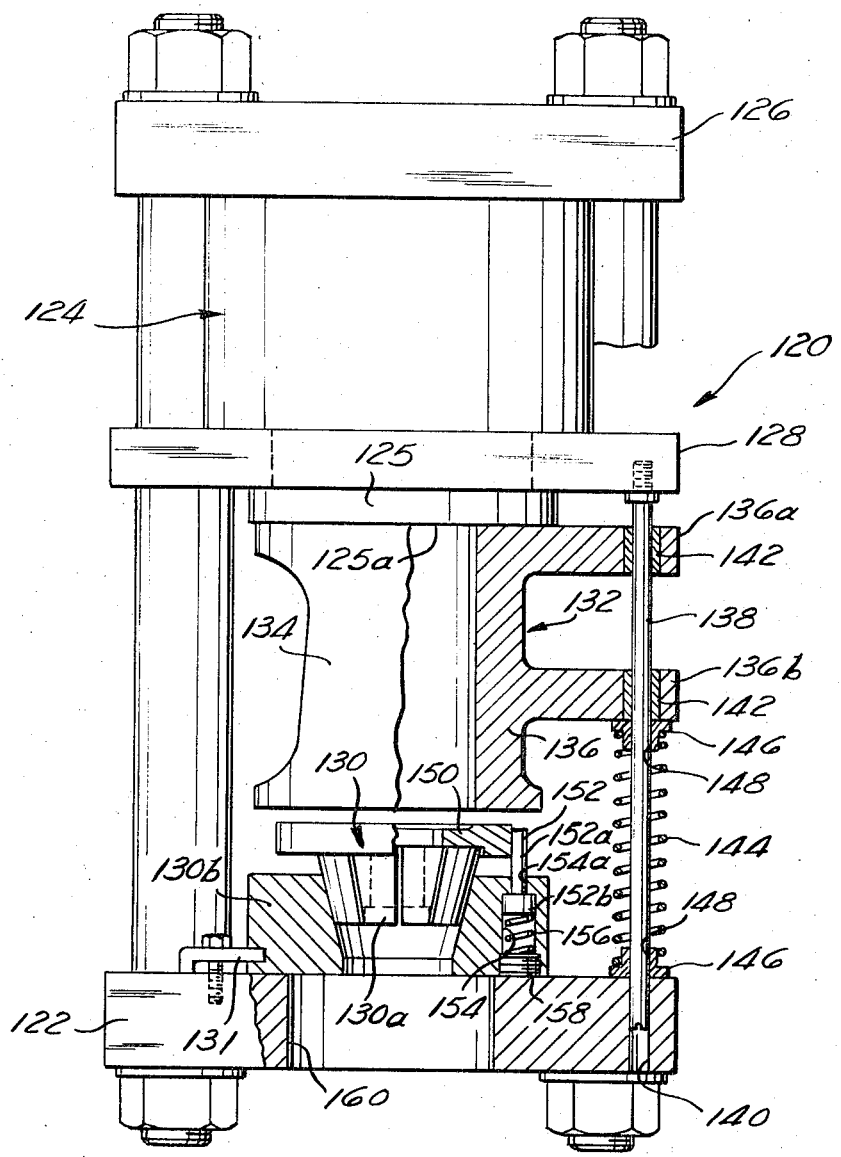
FIG. 5 is a side elevational view partially in section of a second embodiment of a collet crimping apparatus in accordance with the invention.

Referring to FIG. 5, a second embodiment of the invention is shown. In this second embodiment, a crimping machine 120 includes a bed plate 122, a ram 124, a ram plate 125, an upper end plate 126 and a lower end plate 128. The ram 124 is reciprocally movable toward the bed plate 122 and into engagement with an axially aligned collet type die assembly 130 which includes a collet member 130a and a die ring 130b. The overall structure of the crimping machine 120 is substantially identical with tha of the crimping machine 10, and it will not be discussed in detail hereinafter.

In this second embodiment, the collet assembly 130 is retained on the bed plate 122 by a plurality of circumferentially spaced clamps 131 (only one of which is shown in FIG. 5) which are bolted to the bed plate 122. Accordingly, a number of variously sized collet assemblies may be employed in the crimping machine 120 to accommodate different hose and fitting sizes.

A pusher assembly 132 including pusher members 134 and 136 is disposed adjacent the working surface 125a of the ram plate 125 and is axially aligned with the axis of ram movement. The pusher assembly 132 is axially, resiliently mounted on and biased toward the working end of the ram 14. Each of the pusher members 134 and 136 is similarly mounted and for purposes of brevity only the mounting of the member 136 will be discussed in detail, it being understood that the mounting of the member 134 is identical thereto.

The pusher member 136 is mounted by an axially extending pin 138 having one end thereof threadedly engaged with the lower end plate 128 and the other end slidably received within a bore 140 in the bed plate 122. The pin 138 extends in a direction parallel with the axis of ram movement and passes through a lower arm 136b and an upper arm 136a of the pusher member 136. The pine 138 is slidably received within bushings 142 in the arms 136a and 136b of the pusher member 136 to assure axial alignment of the pusher assembly 132 and to facilitate the swinging, opening movement of the pusher member 136.

The pusher member 136 is resiliently biased towards the working end of the ram 124 by means of a compression spring 144 working between the arm 136b and the bed plate 122. In order to assure axial alignment of the compression spring, spring end rings 146 are fastened to each end thereof. Each of the end rings 146 is provided with a central bore 148 having a diameter corresponding to that of the pin 138.

As indicated above, the pusher assembly 132 is resiliently biased towards the working end of the ram 124 to the position shown in FIG. 5 in order to assure clearance for the collet assembly 130 during the loading and unloading procedure. The spring loaded friction between the pusher assembly 132 and the working end of the ram 124 is moderate enough so that the pusher members 134 and 136 can be swung open by hand as soon as the pusher assembly 132 is disengaged from the collet assembly 130 by means of retraction of the ram 124. The ram plate 125 is sized so that it will always be in engagement with the pusher members 134 and 136 and the spring loaded friction is sufficient to retain the pusher members 134 and 136 in any position to which they are moved.

A pressure plate 150 is employed to permit variation in the axial movement of the ram and ensure uniform transmission of ram force to the collet assembly 130 in the same manner as discussed above with respect to the pressure plate 94 of the first embodiment. The proper axial positioning of the pressure plate 150 on the collet member 130a of the collet assembly 130 is assured by a plurality of circumferentially spaced guide pins 152 (only one of which is shown in FIG. 5) which extend upwardly from the die ring 130b of the collet assembly 130 and peripherally engage the pressure plate 150.

Each guide pin 152 is resiliently mounted in an axial bore 154 in the die ring 130b by a compression spring 156. The guide pin 152 includes a reduced diameter portion 152a which projects above the die ring 130b and an enlarged base 152b. The bore 154 is provided with a reduced diameter portion 154a having a diameter corresponding to that of the guide pin portion 152a. Accordingly, the upward movement of the guide pin 152 is limited by the enlarged portion 152b thereof, and the compression spring 156 works between the enlarged portion 152b and a threadedly engaged plug 158 which closes the lower end of the bore 154.

As shown in FIG. 5, the pusher assembly 132 is normally biased against the working end of the ram 124 so as to allow a minimum amount of clearance for the collet assembly 130 and pressure plate 150. During the loading process, the pusher members 134 and 136 are swung open to their laterally disposed position, and they remain in their upwardly biased position by engagement with a portion of the working end surface 125a of the ram plate 125.

The fitting and hose (not shown) which are to be crimped are loaded into the collet assembly 130 through an opening 160 in the bed plate 122. Thereafter, the pusher members 134 and 136 are closed to the ram force transmitting position and the ram 124 is actuated. Upon extension of the ram 124, the resilient mounting of the pusher assembly 132 on the guide pins 138 permits its advance towards the bed plate 122 until the pressure plate 150 comes into contact with the die ring 130b at the completion of the crimping operation. The ram 124 is then retracted and the pusher members 134 and 136 are moved to their open position in order to remove the crimped fitting and hose. The crimping machine 120 may then be reloaded with another fitting and hose (not shown), and the crimping operation repeated.

As exemplified by the illustrated embodiments, a crimping machine embodying the principles of the present invention substantially minimizes the ram stroke and permits the collet assembly to be loaded and unloaded in its crimping position axially aligned with the ram. Accordingly, the advantages of a minimum ram stroke are obtained without the disadvantages associated with prior art two station crimping machines.

The minimization of the ram stroke and provision of a single station crimping operation in accordance with the present invention permits the crimping machine to be conveniently sized and installed as a bench top unit for low volume field applications. The compactness of the machine is efficiently achieved since the hydraulic pressure capacity is maintained in a range sufficient to handle a broad scope of hose size and pressure applications. For example, in one of the crimping machine designs, a maximum operating force of 150 tons is available with a normal operating range of 100 to 125 tons.

Although preferred embodiments of the invention have been shown and described in detail, it is to be understood that various modifications and rearrangements may be resorted to without departing from the scope of the invention as defined by the following claims.

We claim:

1. A machine for radially deforming a workpiece comprising a bed plate, a ram reciprocable along an axis toward and away from said bed plate, a die assembly disposed adjacent said bed plate for receiving said workpiece, driving means for advancing said ram toward said die assembly, and a pusher assembly between said ram and said die assembly for transmitting ram force to said die assembly, said pusher assembly being mounted for lateral pivotal opening movement relative to said ram to expose said die assembly.

2. A machine as set forth in claim 1 wherein said pusher assembly includes a plurality of pusher members arranged to cooperatively transmit ram force to said die assembly, at least one of said pusher members being pivotally mounted for swinging movement from a ram force transmitting position to a laterally disposed position clear of said die assembly.

3. A machine as set forth in claim 2 wherein said pusher assembly has a hollow end portion adjacent said die assembly to accommodate a protruding portion of said workpiece, said hollow end portion terminating at an end surface extending about and at least partially encircling said workpiece.

4. A machine as set forth in claim 3 wherein a pressure plate is disposed between said end surface and said die assembly to assure uniform transmission of pressure to said die assembly, and said die assembly includes axially extending resiliently mounted guide pins which peripherally engage and axially align said pressure plate.

5. A machine as set forth in claim 2 wherein said pusher assembly includes stop means for limiting the swinging movement of said one pusher member into said ram force transmitting position.

6. A machine as set forth in claim 5 wherein said stop means comprises a fixed member axially projecting from said ram.

7. A machine as set forth in claim 2 wherein said pusher assembly has a generally cylindrical configuration, and said one pusher member has a semicylindrical shape and is mounted for swinging movement about an axis parallel to said axis of movement of said ram.

8. A machine as set forth in claim 2 wherein said pusher assembly has a generally cylindrical configuration and comprises separable semicylindrical pusher assembly halves, one of said pusher assembly halves providing said one pusher member and the other of said pusher assembly halves providing a second pusher member, said second pusher member also being mounted for swinging movement from a ram force transmitting position to a laterally disposed position clear of said die assembly.

9. A machine as set forth in claim 1 wherein said pusher assembly is resiliently mounted between said ram and die assembly, said pusher assembly being axially aligned with and resiliently baised toward said ram.

10. A machine as set forth in claim 1 wherein a movable spacer is disposed between said ram and said pusher assembly for limiting the axial movement of said ram away from said bed plate.

11. A machine for crimping a fitting onto a hose comprising a bed plate, a ram reciprocable along an axis toward and away from the bed plate, a die assembly disposed adjacent said bed plate for receiving a hose and fitting to be crimped thereto, moving means for advancing and retracting said ram along said axis toward and away from said bed plate, and a pusher assembly resiliently mounted between said ram and said die assembly, said pusher assembly including pusher members movable between a closed working position for transmitting ram force to said die assembly and an open loading-unloading position clear of said die assembly.

12. A machine as set forth in claim 11 wherein said pusher members are mounted on pin members axially extending from a fixed member of said machine, said pusher members being resiliently biased towards said ram by spring means.

13. A machine as set forth in claim 12 wherein said pin members are parallel with the axis of the movement of said ram.

14. A machine for radially deforming a workpiece comprising a bed plate, a ram reciprocable along a longitudinal axis toward and away from said bed plate, a die assembly disposed adjacent said bed plate for receiving said workpiece, drive means for advancing said ram toward said die assembly, a pusher assembly between said ram and said die assembly, aid pusher assembly having a first pusher member and a second pusher member, said first and second pusher members transmitting ram force to said die assembly, and mounting means mounting at least one of said pusher members for longitudinal movement with said ram along said longitudinal axis and for lateral pivotal movement away from said die assembly about a pivot axis to expose said die assembly.

15. A machine as set forth in claim 14 wherein said pivot axis is parallel to said longitudinal axis and said pivotal movement is perpendicular to said longitudinal axis.

16. A machine as set forth in claim 14 wherein said first and second pusher members together extend through an arc of substantially 360° to apply a uniform pressure to said die assembly, and said mounted pusher member extends through an arc of at least 180°.

17. A machine as set forth in claim 14 wherein said mounting means mounts both of said pusher members for longitudinal movement with said ram along said longitudinal axis and for lateral pivotal movement away from said die assembly about a first pivot axis and a second pivot axis respectively, and said first and second pivot axes are parallel to said ram axis.

18. A machine as set forth in claim 14 wherein said mounted pusher member is movable between a force transmitting position intermediate said ram and said die assembly and a laterally disposed position spaced laterally from said die assembly.

19. A machine as set forth in claim 14 wherein each of said pusher members has a semicylindrical crosssection.

20. A machine as set forth in claim 14 wherein said pusher assembly is mounted on said ram for reciprocating movement with said ram along said longitudinal axis.

21. A machine as set forth in claim 14 wherein said pusher assembly is resiliently mounted between said ram and said die assembly, and said pusher assembly is axially aligned with and resiliently biased toward said ram.

22. A machine for radially deforming a workpiece comprising a bed plate, a ram reciprocable along a longitudinal axis toward and away from said bed plate, a die assembly disposed adjacent said bed plate for receiving said workpiece, a pusher assembly for transmitting ram force to said die assembly, and mounting means mounting said pusher assembly for longitudinal movement with said ram along said longitudinal axis and for lateral movement along a predetermined path between a ram force transmitting position adjacent said die assembly and a laterally disposed position to expose said die assembly.

* * * * *

UNITED STATES PATENT OFFICE
CERTIFICATE OF CORRECTION

Patent No. 3,851,514                    Dated December 3, 1974

Inventor(s) Karl K. Chen and Hiralal V. Patel

It is certified that error appears in the above-identified patent and that said Letters Patent are hereby corrected as shown below:

Column 1, line 13, change "reciving" to --receiving--.

Column 3, line 18, change "rod" to --rods--.

Column 3, line 26, after "plate" insert --36--.

Column 3, line 30, change "bydraulic" to --hydraulic--.

Column 3, line 65, change "menas" to --means--.

Column 4, line 12, after "of" delete --the--.

Column 5, line 18, change "tighteneing" to --tightening--.

Column 5, line 31, change "necesary" to - necessary--.

Column 5, line 39, after "closed" insert --ram--.

Column 6, line 17, change "noramlly" to --normally--.

Column 6, line 51, change "tha" to -- that--.

Column 7, line 10, change "pine" to --pin--.

Column 9, line 35, change "baised" to --biased--.

Column 10, line 7, change "aid" to --said--.

Signed and sealed this 17th day of June 1975.

(SEAL)
Attest:

RUTH C. MASON
Attesting Officer

C. MARSHALL DANN
Commissioner of Patents
and Trademarks